Figure 1A:
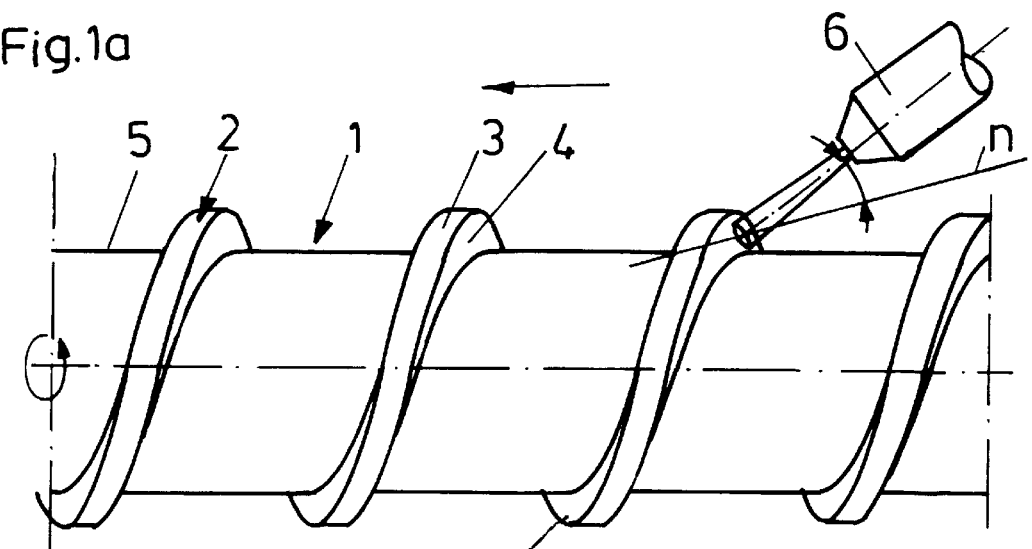

United States Patent
Urbanek et al.

[11] Patent Number: 5,968,603
[45] Date of Patent: Oct. 19, 1999

[54] PROCESS FOR THE PRODUCTION OF WEAR-PROTECTED AND CORROSION-PROTECTED SURFACES ON PLASTICIZING SCREWS FOR INJECTION MOLDING MACHINES

[75] Inventors: Otto Urbanek, Linz; Peter Baldinger, Enns, both of Austria

[73] Assignee: Engel Maschinenbau Gesellschaft m.b.H., Schwertberg, Austria

[21] Appl. No.: 08/849,927

[22] PCT Filed: Oct. 4, 1996

[86] PCT No.: PCT/AT96/00185

§ 371 Date: Jun. 2, 1997

§ 102(e) Date: Jun. 2, 1997

[87] PCT Pub. No.: WO97/13004

PCT Pub. Date: Apr. 10, 1997

[30] Foreign Application Priority Data

Oct. 4, 1995 [AT] Austria ................................ 1640/95

[51] Int. Cl.⁶ .................................................. B05D 1/32
[52] U.S. Cl. ...................... 427/448; 427/449; 427/450; 427/451; 427/455; 427/456; 427/555; 427/556; 427/282; 427/287; 427/405; 427/292; 427/419.7; 427/261
[58] Field of Search ..................... 427/448, 449, 427/450, 451, 455, 456, 555, 556, 287, 282, 405, 419.7, 261, 292

[56] References Cited

U.S. PATENT DOCUMENTS 4,233,072 11/1980 Watanabe et al. ................. 75/236
5,135,378 8/1992 Catton .................................. 425/168

FOREIGN PATENT DOCUMENTS

| 8703012 | 11/1986 | European Pat. Off. . |
| 0305142 | 8/1988 | European Pat. Off. . |
| 0349501 | 5/1989 | European Pat. Off. . |
| 8912115 | 6/1989 | European Pat. Off. . |
| 0451512 | 3/1991 | European Pat. Off. . |
| 0498286 | 1/1992 | European Pat. Off. . |
| 8419806 | 12/1984 | France . |
| 2715942 | 2/1994 | France . |
| 3740916 | 12/1987 | Germany . |
| 4130207 | 9/1991 | Germany . |
| 4233516 | 10/1992 | Germany . |
| 4014410 | 7/1990 | Japan . |

OTHER PUBLICATIONS

Schlei B–und, Korrosionsschutz durch Laserstrahlbeschiechten, Jun. 1995.

*Primary Examiner*—Janyce Bell
*Attorney, Agent, or Firm*—Notaro & Michalos P.C.

[57] ABSTRACT

A process for manufacturing wear and corrosion-protected surfaces on plasticized screws for injection molding machines forms the wear-resistent layers over the entire screw surface in two steps. A laser technique is used to melt additives into the surfaces of the screw rib, flank and top as well as the screw base by high-speed flame spring with hard metallic and/or ceramic substances.

22 Claims, 2 Drawing Sheets

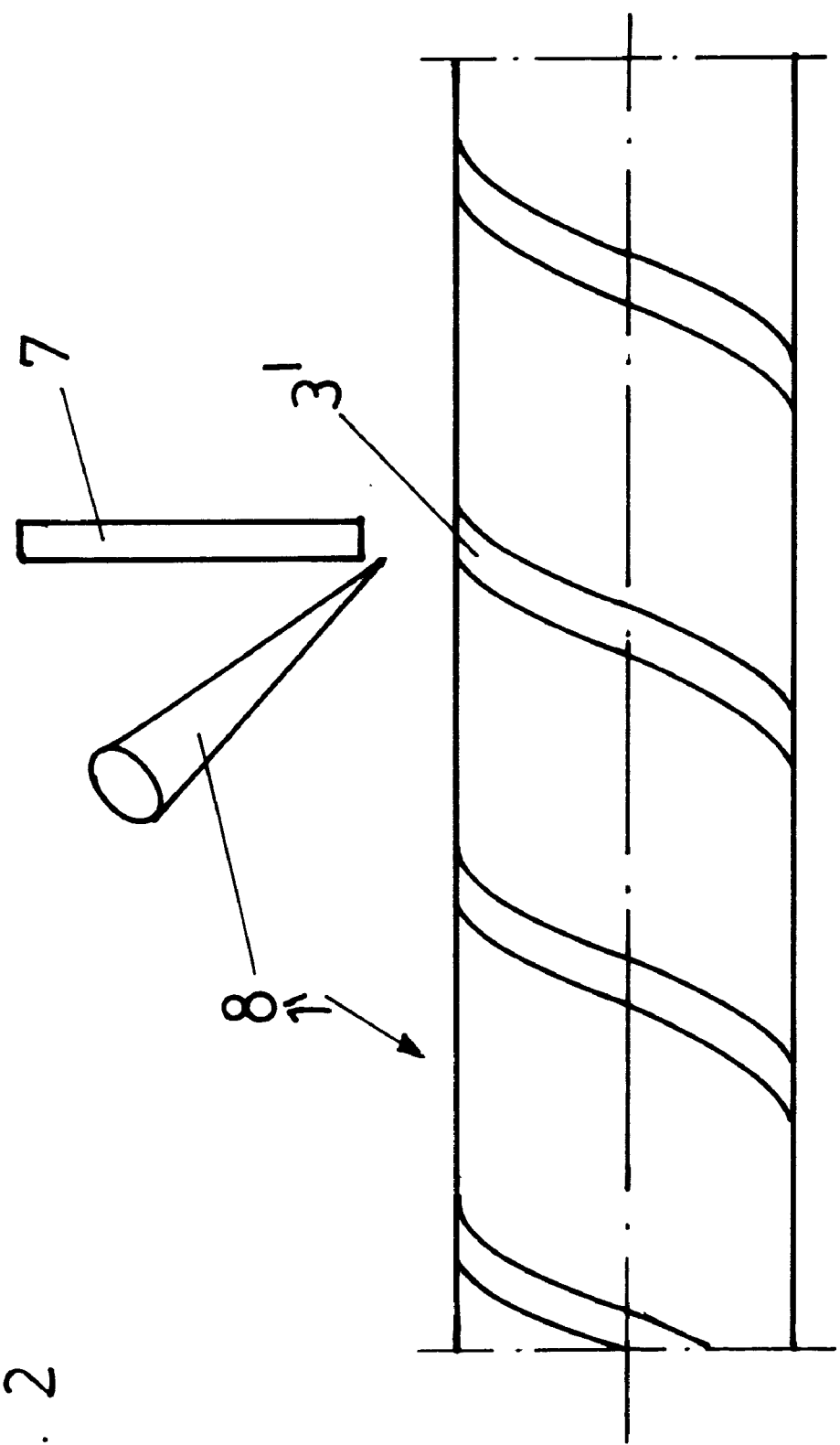

PROCESS FOR THE PRODUCTION OF WEAR-PROTECTED AND CORROSION-PROTECTED SURFACES ON PLASTICIZING SCREWS FOR INJECTION MOLDING MACHINES

The invention relates to a process for producing wear-protected and corrosion-protected surfaces on plasticizing screws for injection molding machines, wherein wear-resistant layers are produced in two process steps on the entire surface of a plasticizing screw.

In order to improve the wear resistance of plasticizing screws, the conventional state of the art provides that the plasticizing screws are hardened or coated by means of flame spraying with subsequent heat treatment. Both can result in deformation of the screw, while in the case of flame spraying, cracks can occur in the coating in the subsequent operation of straightening the plasticizing screw. A plasticizing screw of that kind is therefore not resistant to corrosion.

An object of the present invention is to provide an improved process for coating plasticizing screws, by means of which it is possible to produce a wear-resistant and corrosion-resistant coating, which is operative to produce a conveyor effect, on the surface of the plasticizing screw.

The object in accordance with the invention is attained in that additive substances are fused into the top side of the screw flight by means of laser technology and the flight flanks and the screw bottom are coated with metal, carbide-metal and/or ceramic materials by means of high-speed flame spraying.

The process according to the invention does not involve distortion of the screw main body after the high-speed flame spraying procedure, whereby cracks in the coating are avoided.

It is advantageously provided that additive substances are fused into the top side of the screw flight by means of a laser beam on a cylindrical steel main body in a helical configuration, that thereafter the screw geometry is mechanically finished and that then the flight flanks and the screw bottom are coated by means of high-speed flame spraying.

An embodiment of the invention is described hereinafter with reference to the Figures of the accompanying drawing.

Figure 1B:
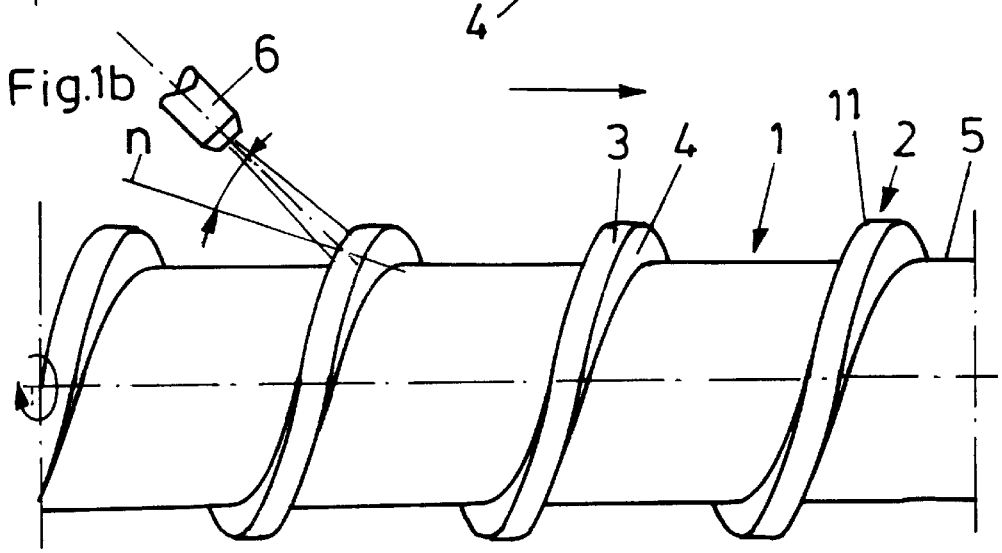
Figure 1C:
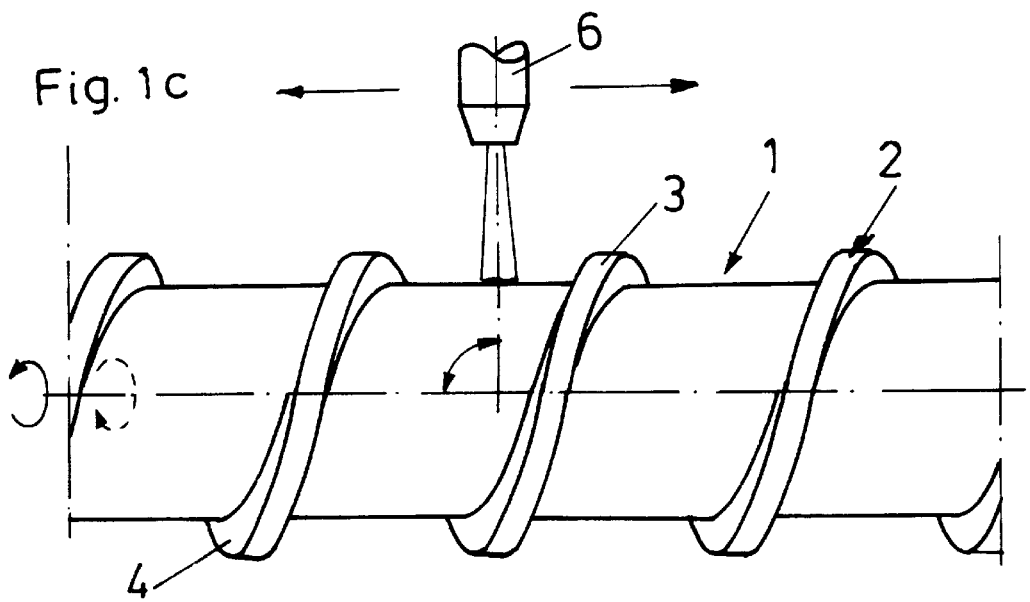

FIGS. 1a, 1b and 1c show parts of the screw main body in various stages of the processing procedure and FIG. 2 shows a part of the cylindrical blank from which the screw is worked.

An additive substance is fused on to the screw blank 1' by means of a nozzle 7 in the region of the top side 3' of the flight, in a helical configuration, by means of a laser beam 8.

The screw geometry is then mechanically finished, with the screw bottom 5 and the flight 2 being shaped out of the screw blank 1'. The shaping operation is preferably effected by a cutting machining procedure such as milling, turning and grinding.

After the actual screw main body 1 has been produced the flight flanks 4 and the screw bottom 5 are coated by means of high-speed flame spraying.

The operation of coating the flight flanks 4 of the screw bottom 5 is effected by means of a burner or torch nozzle 6 by means of which a spray jet of metal, hard-metal or carbide-metal, or ceramic material is applied using the high-speed flame spray process.

The burner nozzle 6 is moved axially a plurality of times over the screw main body 1, with the screw main body 1 being rotated about its longitudinal axis. In that respect the forward feed movement of the burner nozzle 6 corresponds to the pitch of the screw flight. The burner nozzle 6 is oriented at an angle A of 0°–60° relative to the line n normal to the flight flank 4 of the screw flight 2.

At each reversal point the burner nozzle 6 is pivoted in order to spray the oppositely disposed flight flank 4 of the screw flight 2 and likewise at each reversal point the direction of rotation of the screw main body 1 is changed.

After the flanks 4 of the screw flight 2 have been coated the screw bottom 5 is also coated by means of the high-speed flame spray process, in which case, as shown in FIG. 1c, the burner nozzle 6 is oriented at an angle of 90° relative to the longitudinal center line of the screw main body.

It is also possible for the flight flanks 4 to be coated in such a way that the burner nozzle 6 is pivoted at the reversal points, but the direction of rotation of the screw main body 1 is retained.

After the last production step a heat treatment can be effected to minimize inherent stresses in the plasticizing screw.

Prior to the high-speed flame spraying operation, it is advantageous if the surfaces to be processed, that is to say the flight flanks 4 and the screw bottom 5, are cleaned in an ultrasonic bath or manually by means of alcohol solutions. After the cleaning operation the laser-treated flight top side 3 can be covered by means of silicone and the untreated steel surfaces are subjected to a sand blasting process. That process involves the use of iron-free electro-corundum of grain sizes of 0.3–1.5 mm.

The high-speed flame spraying of the sand-blasted regions creates a mechanical laminate bond between the coating material and the screw main body 1. This does not involve a fused bond.

In addition to the laser-treated flight top side 3 it is also possible for portions of the screw surface, for example the flight flanks 4 or the screw bottom 5 to be covered with silicone before the coating operation by means of high-speed flame spraying.

In order to improve the surface of the plasticizing screw the regions which are coated by means of high-speed flame spraying can be worked by means of flexible diamond tools and the laser-coated flight top side 3 can be worked with diamond, CBN, Sic or corundum grinding wheels.

The screw main body 1 of the plasticizing screw comprises steel material.

Metals, hard metals or carbide metals, and/or ceramics, in powder, wire, paste or strip form, are used as the additive substances for the laser treatment.

Mo, Ti, Cr, Ni, Co, Nb, V, W, Al, Mg, Ta, Zr, Si, Fe, Mn, Hf, C, B, N and Ca and their carbides, nitrides, borides, carbonitrides, oxides, carboborides, silicides and sulfides are used individually or in combination as additive substances for the laser treatment.

The following substances are used individually or in combination as coating substances for the high-speed flame spraying operation: Mo, Cr, Ni, Ti, Al, Co, Nb, Co-Ni, Co-Cr, Cr-Ni, Co-Mo-Cr, CrC-NiCr, WC-CrC-Ni, WC-Ni, TiC-CrNi, VC-CrNi, WC-VC-Ni, AlO-ZrO, AlO-TiO, ZrO-MgO and CrO.

We claim:

1. A process for producing wear-protected and corrosion-protected surfaces on plasticizing screws for injection molding machines, wherein wear-resistant layers are produced in two process steps on an entire surface of a plasticizing screw having a screw flight (2) with a top side (3) and flight flanks (4), and a screw bottom (5), characterized in that additive substances are fused into the top side (3) of the screw flight (2) by means of a laser treatment and the flight flanks (4) and the screw bottom (5) are coated by means of flame spraying with metal, carbide-metal and/or ceramic materials.

2. A process as set forth in claim 1 characterised in that additive substances are fused on to a cylindrical steel main body (1') in a helical configuration into the top side (3) of the screw flights (2) by using at least one laser beam, that thereafter the screw geometry of the screw main body (1) is mechanically finished and that then the flight flanks (4) and the screw bottom (5) are coated by means of flame spraying.

3. A process as set forth in claim 2 characterised in that the flight flanks (4) and the screw bottom (5) are coated in separate working operations.

4. A process as set forth in claim 3 characterised in that after a last mechanical production step a heat treatment is effected to minimize inherent stresses in the plasticizing screw.

5. A process as set forth in claim 1 characterised in that a supplied additive substance is fused by means of at least one laser beam into a cylindrical main body into a region of the top side.

6. A process as set forth in claim 1 characterised in that a previously deposited additive substance is fused by means of at least one laser beam into a cylindrical main body into a region of the top side.

7. A process as set forth in claim 6 characterised in that a region of the top side is sides are mechanically pre-fabricated on a cylindrical steel main body (1') in the form of a helical groove.

8. A process as set forth in claim 6 characterised in that the fused into operation is effected in an artificial atmosphere.

9. A process as set forth in claim 1 characterized in that a worked surface of a screw main body (1) of the plasticizing screw is cleaned in an ultrasonic bath or manually by means of alcohol solutions.

10. A process as set forth in claim 1 characterized in that after the cleaning step, the top side is covered by silicone and subjecting surfaces of the plasticizing screw not covered by silicone to a sand blasting procedure, using iron-free electro-corundum in grain sizes of 0.3–1.5 mm.

11. A process as set forth in claim 10 characterised in that the sand-blasted surfaces are coated by flame spraying so as to produce a mechanical laminate bond.

12. A process as set forth in claim 9 characterised in that the screw main body (1) is made from steel material.

13. A process as set forth in claim 1 characterised in that the laser treatment region and other screw surfaces are covered with silicone, prior to the flame spraying operation.

14. A process as set forth in claim 1 characterised in that the region coated by flame spraying is worked with flexible diamond tools and the laser-treated region is worked with diamond, CBN or corundum grinding wheels.

15. A process as set forth in claim 1 characterised in that the plasticizing screw has a screw main body (1) made from steel material.

16. A process as set forth in claim 1 characterised in that metal, carbide-metals and/or ceramics are used as additive substances for the laser treatment.

17. A process as set forth in claim 16 characterised in that the additive substances for the laser treatment are provided in powder, wire, paste or strip form.

18. A process as set forth in claim 1 characterised in that Mo, Ti, Cr, Ni, Co, Nb, V, W, Al, Mg, Ta, Zr, Si, Hf, Fe, Mn, Ca, B, C and N and their carbides, nitrides, borides, carbonitrides, oxides, carboborides, sulfides and suicides are used individually as additive substances for the laser treatment.

19. A process as set forth in claim 1 characterised in that Mo, Ti, Cr, Ni, Co, Nb, V, W, Al, Mg, Ta, Zr, Si, Hf, Fe, Mn, Ca, B, C and N and their carbides, nitrides, borides, carbonitrides, oxides, carboborides, sulfides and silicides are used in combination as additive substances for the laser treatment.

20. A process as set forth in claim 1 characterised in that substances which contain sulfur, tellurium, oxygen and/or selenium are fed to the top side during the laser treatment.

21. A process as set forth in claim 1 characterised in that Mo, Cr, Ni, Ti, Al, Co, Nb, Co-Ni, Co-Cr, Co-Mo-Cr, CrC-NiCr, WC-CrC-Ni, WC-Ni, TiC-CrNi, VC-CrNi, WC-VC-Ni, AlO-ZrO, AlO-TiO, ZrO-MgO and CrO are used individually as flame spray coating substances.

22. A process as set forth in claim 1 characterised in that Mo, Cr, Ni, Ti, Al, Co, Nb, Co-Ni, Co-Cr, Co-Mo-Cr, CrC-NiCr, WC-CrC-Ni, WC-Ni, TiC-CrNi, VC-CrNi, WC-VC-Ni, AlO-ZrO, AlO-TiO, ZrO-MgO and CrO are used in combination as flame spray coating substances.

* * * * *